US005487841A

United States Patent [19]

Young et al.

[11] Patent Number: 5,487,841

[45] Date of Patent: Jan. 30, 1996

[54] MAGNETIC COMPOSITIONS WITH SURFACE ADDITIVES

[75] Inventors: Eugene F. Young, Rochester; Dennis J. O'Keefe, Ontario, both of N.Y.

[73] Assignee: Xerox Corporation, Stamford, Conn.

[21] Appl. No.: 464,920

[22] Filed: Jun. 5, 1995

Related U.S. Application Data

[62] Division of Ser. No. 299,875, Sep. 1, 1994.

[51] Int. Cl.[6] ............................ C04B 35/47; C01G 49/06

[52] U.S. Cl. ............................ 252/62.59

[58] Field of Search ............................ 430/106.6, 110; 252/62.59, 62.54

[56] References Cited

U.S. PATENT DOCUMENTS

| | | | |
|---|---|---|---|
| 4,530,894 | 7/1985 | Imamura et al. | 430/106.6 |
| 4,975,214 | 12/1990 | Sakashita et al. | 252/62.59 |
| 5,047,161 | 9/1991 | Steck et al. | 252/62.59 |
| 5,124,207 | 6/1992 | Hayashi et al. | 252/62.59 |

*Primary Examiner*—John Goodrow
*Attorney, Agent, or Firm*—E. O. Palazzo

[57] ABSTRACT

A toner comprised of resin, magnetite treated, or coated with a phosphate titanium component, optional wax, charge additive, and surface additives comprised of silica and metal oxides.

2 Claims, No Drawings

MAGNETIC COMPOSITIONS WITH SURFACE ADDITIVES

This is a division of application Ser. No. 08/299,875 pending, filed Sep. 1, 1994, the disclosure of which is incorporated herein by reference in its entirety.

BACKGROUND OF THE INVENTION

The invention is generally directed to toner and developer compositions, and more specifically, the present invention is directed to developer and toner compositions containing charge enhancing additives, which impart or assist in imparting a negative charge to the toner resin particles and enable toners with rapid charging characteristics, and wherein there is selected as the toner pigment a magnetite, especially a spherical magnetite treated with a phosphate titanium coupling agent, and which magnetite is available from Toda Chemicals of Japan. In embodiments of the present invention, there are provided single component toners containing magnetites treated with or containing a coating of a phosphate titanium coupling agent. The toner compositions of the present invention in embodiments thereof possess rapid charging or admix characteristics, and maintain their triboelectric charging characteristics for an extended number of imaging cycles. Furthermore, the toner compositions of the present invention are substantially insensitive to relative humidity and enable developed images with excellent optical densities. The toners of the present invention possess improved relative humidity sensitivity as compared to related toners indicated herein. Moreover, the toners of the present invention enable developed images with excellent solid area densities (SAD) of, for example, from about 1.2 to about 1.5, and preferably from about 1.3 to about 1.5. Also, the toner compositions of the present invention can be selected for electrophotographic, especially xerographic imaging and printing processes.

Developer compositions with charge enhancing additives, which impart a positive or negative charge to the toner resin, are known. Thus, for example, there is described in U.S. Pat. No. 3,893,935 the use of quaternary ammonium salts as charge control agents for electrostatic toner compositions. In this patent, there are disclosed quaternary ammonium compounds with four R substituents on the nitrogen atom, which substituents represent an aliphatic hydrocarbon group having 7 or less, and preferably about 3 to about 7 carbon atoms, including straight and branch chain aliphatic hydrocarbon atoms, and wherein X represents an anionic function including, according to this patent, a variety of conventional anionic moieties such as halides, phosphates, acetates, nitrates, benzoates, methyl sulfates, perchloride, tetrafluoroborate, benzene sulfonate, and the like; U.S. Pat. No. 4,221,856 which discloses electrophotographic toners containing resin compatible quaternary ammonium compounds in which at least two R radicals are hydrocarbons having from 8 to about 22 carbon atoms, and each other R is a hydrogen or hydrocarbon radical with from 1 to about 8 carbon atoms, and A is an anion, for example sulfate, sulfonate, nitrate, borate, chlorate, and the halogens such as iodide, chloride and bromide, reference the Abstract of the Disclosure and column 3; a similar teaching is presented in U.S. Pat. No. 4,312,933 which is a division of U.S. Pat. No. 4,291,111; and similar teachings are presented in U.S. Pat. No. 4,291,112 wherein A is an anion including, for example, sulfate, sulfonate, nitrate, borate, chlorate, and the halogens. There are also described in U.S. Pat. No. 2,986,521 reversal developer compositions comprised of toner resin particles coated with finely divided colloidal silica. According to the disclosure of this patent, the development of electrostatic latent images on negatively charged surfaces is accomplished by applying a developer composition having a positively charged triboelectric relationship with respect to the colloidal silica.

Also, there are disclosed in U.S. Pat. No. 4,338,390, the disclosure of which is totally incorporated herein by reference, developer compositions containing as charge enhancing additives organic sulfate and sulfonates, which additives can impart a positive charge to the toner composition. Further, there are disclosed in U.S. Pat. No. 4,298,672, the disclosure of which is totally incorporated herein by reference, positively charged toner compositions with resin particles and pigment particles, and as charge enhancing additives alkyl pyridinium compounds. Additionally, other documents disclosing positively charged toner compositions with charge control additives include U.S. Pat. Nos. 3,944,493; 4,007,293; 4,079,014; 4,394,430, and 4,560,635 which illustrates a toner with a distearyl dimethyl ammonium methyl sulfate charge additive.

Moreover, toner compositions with negative charge enhancing additives are known, reference for example U.S. Pat. Nos. 4,411,974 and 4,206,064, the disclosures of which are totally incorporated herein by reference. The '974 patent discloses negatively charged toner compositions comprised of resin particles, pigment particles, and as a charge enhancing additive ortho-halo phenyl carboxylic acids. Similarly, there are disclosed in the '064 patent toner compositions with chromium, cobalt, and nickel complexes of salicylic acid as negative charge enhancing additives.

There is illustrated in U.S. Pat. No. 4,404,271 a complex system for developing electrostatic images with a toner, which contains a metal complex represented by the formula in column 2, for example, and wherein ME (metal) can be chromium, cobalt or iron. Additionally, other patents disclosing various metal containing azo dyestuff structures wherein the metal is chromium or cobalt include U.S. Pat. Nos. 2,891,939; 2,871,233; 2,891,938; 2,933,489; 4,053,462 and 4,314,937. Also, in U.S. Pat. No. 4,433,040, the disclosure of which is totally incorporated herein by reference, there are illustrated toner compositions with chromium and cobalt complexes of azo dyes as negative charge enhancing additives. Further, TRH as a charge additive is illustrated in a number of patents such as U.S. Pat. No. 5,278,018, the disclosure of which is totally incorporated herein by reference.

In the aforementioned U.S. Pat. No. 5,278,018 there is illustrated a negatively charged toner with crosslinked resin particles, silane treated magnetite particles, wax particles, and a negative chromate charge additive. This patent discloses toner insensitivity to RH, see for example column 1, line 34. The SAD of the developed images of the '018 patent is inferior in some instances when compared to the SADs of the present invention as illustrated herein.

Toner compositions with surface additives of metal salts of fatty acids, colloidal silicas, and the like are known, reference some of the patents mentioned herein; U.S. Pat. Nos. 3,655,374; 3,720,617 and 3,900,588.

Illustrated in copending application U.S. Ser. No. 073,374 (now abandoned), the disclosure of which is totally incorporated herein by reference, is a single component toner composition comprising:

(i) toner particles, comprising:

(A) from about 45 to about 90 parts by weight of a resin selected from copolymers or terpolymers comprising residues of (a) at least one vinyl monomer and (b) at least one ester of an alphamethylene aliphatic monocarboxylic acid; wherein the resin has a glass transition temperature ranging from about 45° C. to about 55° C. and a melt flow index ranging from about 25 to about 29 grams per 10 minutes at 150° C. and a 2.16 kilogram load;

(B) from about 2 to about 6 parts by weight of a charge enhancing additive;

(C) an effective amount of a colorant; and (D) an effective amount of a low molecular weight wax; and (ii) external additives comprising:

(E) flow aid particles in an amount of from about 0.1 to about 0.6 part by weight per 100 parts of the weight of the toner particles; and (F) metal oxide particles in an amount of from about 1 to about 4 parts by weight per 100 parts of the weight of the toner particles; wherein components (i) and (ii) are blended for a time period and at a rate sufficient to cause the external additive particles to adhere to surfaces of the toner particles.

SUMMARY OF THE INVENTION

Examples of objects of the present invention include the following.

It is an object of the present invention to provide toner and developer compositions with charge enhancing additives and treated, or coated magnetites, especially spherical magnetites, enabling single component toners with reduced high humidity sensitivity.

In another object of the present invention there are provided negatively charged single component toner compositions with phosphate titanium treated, or coated magnetites and which toners are substantially insensitive to relative humidity and are useful for the development of electrostatic latent images including color images.

In yet another object of the present invention there are provided negatively charged toner compositions with excellent admix and excellent triboelectric characteristics.

In yet a further object of the present invention there are provided humidity insensitive toners, from about, for example, 10 to 90 percent relative humidity at temperatures of from 60° to 80° F. as determined in a relative humidity testing chamber.

Another object of the present invention resides in the provision of toners that can enable developed electrostatic images with excellent optical densities of, for example, at least about 1.2 and, more specifically, from about 1.2 to about 1.5, and which toners will enable the development of images in electrophotographic imaging apparatuses, which images have substantially no background deposits thereon, are substantially smudge proof or smudge resistant, and therefore are of excellent resolution; and further, such toner compositions can be selected for high speed electrophotographic apparatuses, that is those exceeding 50 copies per minute.

An important object of the present invention resides in the provision of improved single component toners containing phosphate titanium coated magnetites, and wherein the toners enable images with excellent solid area densities preferably, for example, of from about 1.3 to about 1.5 as determined with a densitometer, such as the Macbeth Model RD-922.

These and other objects of the present invention can be accomplished in embodiments thereof by providing toners comprised of resin particles, treated or coated magnetite particles, optional waxes, and optional charge enhancing additives, and which toners contain surface additives, such as AEROSIL®, metal salts of fatty acids, metal oxides like strontium titanate, cerium oxide, mixtures thereof, and the like. More specifically, the present invention is directed to negatively charged single component toner compositions, or particles comprised of resin particles, waxes, certain treated magnetites, especially magnetite treated with a phosphate titanium coupling agent and available as Toda MAT305J 1L from Toda Chemicals, a negative charge additive like a chromate charge additive especially 3-hydroxy-4-(2-hydroxy-3,5-dinitrophenylazo-N-phenyl- 2-naphthalenecarboxamidato-2-hydrogen-chromate), and surface additives.

Known surface additives in effective amounts can be included in the toners of the present invention, reference U.S. Pat. No. 5,278,018, the disclosure of which is totally incorporated herein by reference. Specific examples of additives include metal oxides, like cerium oxide, titanium oxides, strontium-titanate, and mixtures thereof. One preferred additive mixture is comprised of AEROSIL R812® available from Degussa Chemical and strontium titanate. The aforementioned additives are present in various effective amounts, such as for example from about 0.05 to about 5 weight percent. In embodiments, the colloidal silica particles are present in an amount of from about 0.05 to about 2, and preferably from about 0.3 to about 0.5 weight percent, and the metal oxide, preferably strontium titanate, is present in an amount of from about 0.5 to about 5, and preferably from about 1.5 to about 3.5 weight percent.

The treated magnetites, which are available from Toda Kogyo, are as more specifically illustrated herein, reference for example the data provided in the Table that follows. These magnetites contain a coating of phosphate titanium in an amount, for example, of from about 0.5 to about 1 weight percent, and preferably about 0.5 weight percent. The aforementioned treated magnetites are present in the toner in various effective amounts, such as for example from about 15 to about 50, and preferably from about 20 to about 35 percent by weight.

Illustrative examples of suitable toner resins selected for the toner and developer compositions of the present invention include polyamides, polyolefins, polyesters, styrene acrylates, styrene methacrylate, styrene butadienes, crosslinked styrene polymers, epoxies, polyurethanes, vinyl resins, including homopolymers or copolymers of two or more vinyl monomers; and polymeric esterification products of a dicarboxylic acid and a diol comprising a diphenol. Vinyl monomers include styrene, p-chlorostyrene, unsaturated mono-olefins such as ethylene, propylene, butylene, isobutylene and the like; saturated mono-olefins such as vinyl acetate, vinyl propionate, and vinyl butyrate; vinyl esters like esters of monocarboxylic acids including methyl acrylate, ethyl acrylate, n-butylacrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; mixtures thereof; and the like. Specific resin examples include styrene butadiene copolymers with a styrene content of from about 70 to about 95 weight percent, reference the U.S. patents mentioned herein, the disclosures of which have been totally incorporated herein by reference. In addition, crosslinked resins, including polymers, copolymers, homopolymers of the aforementioned styrene polymers, may be selected. One preferred resin is comprised of styrene, 51 weight percent, n-butylmethacrylate, 49 weight percent and which resin has been crosslinked with divinylbenzene, 0.05 weight percent, or benzoyl peroxide, 3 weight percent.

As a toner resin, there can be selected the esterification products of a dicarboxylic acid and a diol comprising a diphenol. These resins are illustrated in U.S. Pat. No. 3,590,000, the disclosure of which is totally incorporated herein by reference. Other specific toner resins include styrene/methacrylate copolymers, and styrene/butadiene copolymers; PLIOLITES™; suspension polymerized styrene butadienes, reference U.S. Pat. No. 4,558,108, the disclosure of which is totally incorporated herein by reference; polyester resins obtained from the reaction of bisphenol A and propylene oxide; followed by the reaction of the resulting product with fumaric acid, and branched polyester resins resulting from the reaction of dimethylterephthalate, 1,3-butanediol, 1,2-propanediol, and pentaerythritol, styrene acrylates, and mixtures thereof; the extruded polyesters of U.S. Pat. No. 5,227,460, the crosslinked resins of U.S. Pat. No. 4,824,750, the disclosure of which is totally incorporated herein by reference. Also, waxes with a molecular weight of from about 1,000 to about 20,000 such as polyethylene, polypropylene, reference for example British Patent Publication 1,442,835, the disclosure of which is totally incorporated herein by reference, and paraffin waxes can be included in, or on the toner compositions primarily as fuser roll release agents and to avoid or minimize offset of the toner to paper. Examples of preferred waxes include VISCOL 550P™, 660P™, SHAMROCK P40™, WEGO GT8520™, and the like. These waxes are present in various effective amounts, such as for example from about 1 to about 35 percent and preferably from about 2 to about 15 percent. The resin particles are present in a sufficient, but effective amount, for example from about 60 to about 90 weight percent. Thus, when 1 percent by weight of the charge enhancing additive is present, and 10 percent by weight of the treated magnetite is contained therein, about 89 percent by weight of resin is selected.

There can also be blended with the toners of the present invention external additive particles including flow aid additives, which additives are usually present on the surface thereof. Examples of these additives include colloidal silicas, such as AEROSIL®, metal salts and metal salts of fatty acids inclusive of zinc stearate, aluminum oxides, cerium oxides, strontium titanate, and mixtures thereof, which additives are generally present in, for example, an amount of from about 0.5 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures of which are totally incorporated herein by reference. One additive mixture is comprised of an AEROSI L® like R812®, preferably present in an amount of about 0.4 weight percent and strontium titanate preferably present in an amount of about 2.5 weight percent based on the weight of toner, for example, for 100 grams of toner, 40 grams of R812®and 2.5 grams of strontium titanate would be present.

With further respect to the present invention, colloidal silicas, such as AEROSIL®, can be surface treated with the charge additives of the present invention illustrated herein in an amount of from about 1 to about 30 weight percent and preferably 10 weight percent, followed by the addition thereof to the toner in an amount of from 0.1 to 10 and preferably 0.1 to 1 weight percent.

Also, there can be included in the toner compositions of the present invention as indicated herein low, for example from about 1,000 to about 20,000 and preferably from about 1,000 to about 7,000 weight average, molecular weight waxes, such as polypropylenes and polyethylenes commercially available from Allied Chemical and Petrolite Corporation, EPOLENE N-15™ commercially available from Eastman Chemical Products, Inc., VISCOL 550-P ™, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions of the present invention are believed to have a molecular weight of from about 4,000 to about 7,000. Many of the polyethylene and polypropylene compositions useful in the present invention are illustrated in British Patent 1,442,835, the disclosure of which is totally incorporated herein by reference.

The low molecular weight wax materials are present in the toner composition of the present invention in various amounts, however, generally these waxes are present in the toner composition in an amount of from about 1 percent by weight to about 15 percent by weight, and preferably in an amount of from about 2 percent by weight to about 10 percent by weight.

One preferred toner contains 60 weight percent of resin, especially a styrene, 51 weight percent; n-butylmethacrylate, 49 weight percent; and which resin has been crosslinked with divinylbenzene, 0.05 weight percent, and benzoyl peroxide, 3 weight percent; 32 percent plus or minus 2 percent by weight of the treated or coated magnetite; 5 weight percent of wax like polypropylene, such as 550P™ available from Sanyo Chemicals of Japan; 3 weight percent plus or minus 1 percent of charge additive, and as external additives 0.4 weight percent, plus or minus 0.1, of the colloidal silica AEROSIL R812®, available from Degussa Chemicals, and 2.5 weight, plus or minus 0.5, percent of strontium titanate.

The toners of the present invention may be selected for use in electrostatographic imaging apparatuses containing therein conventional photoreceptors. Thus, the toner and developer compositions of the present invention can be used with layered photoreceptors, reference U.S. Pat. No. 4,265, 990, the disclosure of which is totally incorporated herein by reference. Illustrative examples of inorganic photoreceptors that may be selected for the imaging and printing processes include selenium; selenium alloys, such as selenium arsenic, selenium tellurium and the like; halogen doped selenium substances; and halogen doped selenium alloys. Other photoreceptors, or photoconductive imaging members can be selected such as amorphous silicon, layered members comprised of photogenerating components like selenium, and charge transport molecules like aryldiamines, reference U.S. Pat. No. 4,265,990, the disclosure of which is totally incorporated herein by reference.

The toner compositions can be prepared by known melt blending processes, or by extrusion, and are usually jetted and classified subsequent to preparation to enable toner particles with a preferred average diameter of from about 5 to about 25 microns, and more preferably from about 8 to about 13 microns.

The following Examples are being supplied to further define various species of the present invention, it being noted that these Examples are intended to illustrate and not limit the scope of the present invention. Parts and percentages are by weight unless otherwise indicated. Comparative information is also provided.

EXAMPLE I

Toners were prepared by placing in a Banbury mixing apparatus, and mixing for 5 minutes resin, coated magnetite, charge additive, and wax. The toner components were then removed from the Banbury and placed in a rubber mill containing a pair of rollers. The toner components were mixed in the rubber mill for 5 minutes. Subsequently, the toner was removed from the rubber mill and crushed into particles with an average volume diameter of 800 microns, which crushing was accomplished with a mechanical crusher. Thereafter, the toner particles were ground on a jet mill to 11 to 12 microns in average volume diameter as measured with a Coulter Counter. The toner was then classified to remove toner fines with, for example, an average volume particle diameter of 5 microns or less. There were then blended for one hour in a jar with steel balls the above prepared toners and surface additives of, for example, the AEROSIL® and strontium titanate, and wherein the additives adhered to the toner surface.

A toner of the present invention, which was prepared as described above, contained 60 weight percent of resin, especially a styrene, 51 weight percent, n-butylmethacrylate, 49 weight percent, and which resin had been crosslinked with divinylbenzene, 0.05 weight percent, and/or benzoyl peroxide, 3 weight percent, 32 percent by weight of the treated or coated magnetite, 5 weight percent of polypropylene 550P™ wax, available from Sanyo Chemicals of Japan, 3 weight percent of the charge additive TRH, and as external additives 0.4 weight percent of the colloidal silica AEROSIL R812®, available from Degussa Chemicals, and 2.5 weight percent of strontium titanate, reference toner 4 of the Table that follows. Other toners were similarly prepared with the components as illustrated in the Table, and with the above resin.

The SADs for toner 1 were determined as follows, reference 1 below.

The SADs for toner 2 were determined as follows, reference 2 below.

SADs of 1.3 to 1.5 were preferred primarily for the reasons as indicated in 2 that follows.

Regarding the Table:

Size is in average volume diameter. The Table invention toners are, for example, 4 and 5, while the prior art toners are, for example, 1, 2, and 3.

1. TEST PROTOCOL: The test machine, similar to the Canon NP8580, was set up according to the instruction book procedures. The toner was loaded into the developer housing and copies were generated using four different test subjects that were used in rotation. The solid area density (SAD) was measured initially at 10, 50, 100, and 500 copies. The test subject used had two one inch squares on it in addition to text. The SAD was measured in 3 places on each square. Measurements were taken on 5 sequential copies. The SAD quoted for a run was the average over all measurements at the check points. The tests were run at 70° F./50 percent RH, 80° F./10 percent RH or 60° F. and 15 percent RH, and 80° F. and 80 percent RH. An average SAD was calculated for each condition. Only selected data points are quoted herein.

2. A density below 1.3 was readable, but was not anesthetically acceptable. It tended to be nonuniform. It fell below the benchmark of about equal to or greater than 1.3. For densities above 1.5, there was a tendency for the machine to produce black steaks or background on the copy due to excess toner present in the development zone or excess toner charge causing over development. It also stressed the cleaning system and caused cleaning failures.

Other modifications of the present invention may occur to those skilled in the art subsequent to a review of the present application, and these modifications, including equivalents thereof, are intended to be included within the scope of the present invention.

TABLE

| MFG | MAGNETITE | TYPE | SHAPE | SIZE MICRON | COATING | TREATMENT % | FORMULATION R | M | W | C | A1 | A2 | REMARKS |
|---|---|---|---|---|---|---|---|---|---|---|---|---|---|
| 1 Toda | MAT305K3 | $Fe_2O_3$ | Spherical | 0.23 | γ-Chloro-propyl-trimethoxy silane | 1.0 | 58 | 34 | 5 | 3 | 0.4 | 1.0 | Unacceptable decrease in SAD (1.4 to 1.2) at 80/10 |
| | | | | | | | 60 | 32 | 5 | 3 | 0.4 | 2.5 | Unacceptable decrease in SAD (1.53 to 1.3) at 80/10 |
| | | | | | | | 58 | 34 | 5 | 3 | 0.4 | 2.5 | Unacceptable decrease in SAD (1.56 to 1.34) at 80/10 |
| 2 Toda | MAT305K4L | $Fe_2O_3$ | Spherical | 0.23 | γ-Glycidoxy-propyl-trimethoxy silane | 0.5 | 58 | 34 | 5 | 3 | 0.4 | 1.0 | Unacceptably low SAD (1.19) at 80/10 |
| 3 Toda | MAT305K4N | $Fe_2O_3$ | Spherical | 0.23 | γ-Glycidoxy-propyl-trimethoxy silane | 1.0 | 58 | 34 | 5 | 3 | 0.4 | 1.0 | Unacceptably Low SAD (1.15) at 80/10 |
| 4 Toda | MAT305J1L | $Fe_2O_3$ | Spherical | 0.23 | Isopropyl-tridioctyl pyro-phosphato titanate | 0.5 | 58 | 34 | 5 | 3 | 0.4 | 1.0 | Good SAD (1.4) at 70/20 |
| | | | | | | | 60 | 32 | 5 | 3 | 0.4 | 2.5 | SAD 1.6 at 70/50, 1 Day SAD 1.59 at 60/15, 1 Day SAD 1.55 at 80/80 Day 1 SAD 1.55 at 80/80 Day 2 SAD 1.53 at 80/80 Day 3 Meets Test Criteria A Preferred Embodiment Above |
| | | | | | | | 58 | 34 | 5 | 3 | 0.4 | 2.5 | SAD Drops Off at 80/10 From 1.47 to 1.39 on Second Day of Testing |

TABLE-continued

| MFG | MAGNETITE | TYPE | SHAPE | SIZE MICRON | COATING | TREATMENT % | FORMULATION R | M | W | C | A1 | A2 | REMARKS |
|---|---|---|---|---|---|---|---|---|---|---|---|---|---|
| | | | | | | | | | | | | | Shows SAD is Sensitive to Magnetite Loading |
| 5 Toda | MAT305J1N | $Fe_2O_3$ | Spherical | 0.23 | Isopropyl-tridioctyl pyrophosphato titanate | 1.0 | 58 | 34 | 5 | 3 | 0.4 | 1.0 | SAD (1.32) at Low End of Acceptance Limit at 70/20 Test Ended |
| 6 Toda | MAT305J3L | $Fe_2O_3$ | Spherical | 0.23 | 2-Propanolate tris octadecanoate-titanium | 0.5 | 58 | 34 | 5 | 3 | 0.4 | 1.0 | Unacceptably Low SAD (1.07) at 80/10 |
| 7 Toda | MAT305J3N | $Fe_2O_3$ | Spherical | 0.23 | 2-Propanolate tris octadecanoate-titanium | 1.0 | 58 | 34 | 5 | 3 | 0.4 | 1.0 | Unacceptably Low SAD (0.75) at 70/20 |
| 8 Toda | MAT305J4L | $Fe_2O_3$ | Spherical | | Tetrakis-2-allyloxy-methyl-1-butoxy titanium bis di-tridecyl phosphite | 0.5 | 60 | 32 | 5 | 3 | 0.4 | 2.5 | SAD (1.28) at Low End of Acceptance Limit at 80/10 |
| | | | | | | | 58 | 34 | 5 | 3 | 0.4 | 2.5 | Unacceptably Low SAD (1.18) at 80/10 |
| 9 Toda | MAT305Z1L | $Fe_2O_3$ | Spherical | 0.23 | 9-Octadecenyl 3-oxo-butanoato-bis 2-propanplato aluminum | 0.5 | 58 | 34 | 5 | 3 | 0.4 | 1.0 | SAD (1.31) at 70/20 |
| | | | | | | | 60 | 32 | 5 | 3 | 0.4 | 2.5 | Acceptable SAD 1.59–1.63 at 80/10 |
| | | | | | | | 58 | 34 | 5 | 3 | 0.4 | 2.5 | SAD in Acceptable Range but Not Uniform (1.38–1.60) at 80/10 SAD 1.53 at 70/50 SAD 1.60 on Day 1 and 1.52 on Day 2 at 80/10 SAD 1.55 on Day 1, 1.38 on Day 2 and 1.38 on Day 3 at 80/80 See Note Below |
| 10 Toda | MAT305Z1N | $Fe_2O_3$ | Spherical | 0.23 | 9-Octadecenyl 3-oxo-butanoato-bis 2-propanplato aluminum | 1.0 | 58 | 34 | 5 | 3 | 0.4 | 1.0 | Severe SAD Drop Off From 1.41 on Day 1 to 0.9 on Day 2 at 80/10 |
| 15 Columbian | MAPICO | FeO—$Fe_2O_3$ | Spherical | 0.5 | NONE | — | 58 | 34 | 5 | 3 | 0.4 | 1.0 | SAD Unacceptably Low (1.0) at 80/10 |
| 16 Mobay | PK5184 | | Spherical | — | Hydrophobic | — | 58 | 34 | 5 | 3 | 0.4 | 1.0 | Unacceptably Low SAD (1.23) at 70/20 |
| 17 Mobay | PK5153M | | Precipitated Isometric (Cubic) | — | NONE | — | 58 | 34 | 5 | 3 | 0.4 | 1.0 | Drop Off in SAD From 1.59 on Day 1 to 1.37 on Day 2 of Testing at 80/10 Caused Rejection |
| 19 Harcros | TB5600 | $Fe_3O_4$ | Cubic | 0.3 | NONE | — | 58 | 34 | 5 | 4 | 0.4 | 1.0 | SAD Unacceptably Low (1.2) at 80/10 |
| | | | | | | | 58 | 34 | 5 | 4 | 0.4 | 2.5 | SAD Unacceptably Low (<1.3) at 80/80 |
| | | | | | | | 58 | 34 | 5 | 4 | 0.5 | 2.5 | SAD Unacceptably Low (<1.3) at 80/80 |

SAD = Solid Area Density; 80/10 = 80° F. and 10% RH; BKG = Background; R = Resin; M = Magnetite; W = Wax (550P); C = CCA (TRH); A1 = External additive 1 (R812 ® AEROSIL); A2 = External additive 2 (Strontium Titanate).
ACCEPTANCE CRITERIA: SAD ≧1.3 density units at 70/50, 60/15 or 80/10, and 80/80 (minimum two days of testing at 80/80). SAD to remain uniform during a run, no drop off greater than 0.1 density units.

What is claimed is:

1. A composition consisting essentially of resin particles, magnetite treated, or coated with a phosphate titanium coupling component, wax, a charge additive, and surface additives comprised of a mixture of colloidal silica and metal oxides, and wherein said magnetite particles are present in an amount of from about 15 to about 50 weight percent.

2. A composition comprised consisting essentially of resin particles, magnetite treated, or coated with a phosphate titanium coupling component, wax component, a charge additive, and surface additives comprised of a mixture of colloidal silica and strontium titanate, and wherein said magnetite particles are present in an amount of from about 15 to about 50 weight percent.

* * * * *